United States Patent Office 3,458,492
Patented July 29, 1969

3,458,492
ALIPHATIC DILUENTS IN PRODUCTION OF CIS-POLYBUTADIENE
Ralph C. Farrar, Bartlesville, Okla., assignor to Phillips Petroleum Company, a corporation of Delaware
No Drawing. Filed Nov. 18, 1964, Ser. No. 412,216
Int. Cl. C08d 1/14
U.S. Cl. 260—94.3         3 Claims

ABSTRACT OF THE DISCLOSURE

The polymerization of 1,3-butadiene in the presence of a catalyst formed on the mixing of an organometallic compound and an iodine-containing component including titanium halide in the presence of an aliphatic or cycloaliphatic diluent and a minor amount of halogenated or nitrated alkane, cycloalkane, or aromatic hydrocarbon or mixtures thereof.

---

This invention relates to an improved method for preparing a polybutadiene containing a high percentage of cis-1,4 addition. In one of its aspects this invention relates to the use of aliphatic diluents in the production of cis-polybutadiene.

In recent years there has been a great deal of research work directed toward the production of improved rubbery polymers. Great advances have recently been made in this field as a result of the discovery of new catalyst systems. These catalyst systems are often referred to as being "stereospecific" since they are capable of polymerizing monomers, particularly conjugated dienes, to a certain geometric configuration. One of the products which has attracted widespread attention because of its outstanding and superior properties is polybutadiene containing a high percentage, e.g., at least 80, preferably at least 85 percent, of cis-1,4 addition. The physical properties of this high cis-1,4-polybutadiene are of such a nature that the polymer is particularly suitable for the application of heavy duty tires and other articles for which conventional synthetic rubbers have heretofore been comparatively unsatisfactory. It is well known in the art to polymerize 1,3-butadiene in the presence of a catalyst formed on mixing an organometallic compound and an iodine-containing component to give polymers having a predominantly cis-1,4 structure. The polymerization reactions are usually conducted in an aromatic hydrocarbon diluent. The aromatic hydrocarbon diluents produce a high conversion rate of the 1,3-butadiene to a cis-1,4 polymer. However, when aromatic hydrocarbons are employed, the polymer solutions have a tendency to be more viscous and agitation often becomes difficult unless a very large amount of diluent is used. Aliphatic hydrocarbons have been used as diluents for the polymerization reaction but it has been found that they greatly reduce the rate of conversion of the 1,3-butadiene to the cis-1,4 polymer. The present invention is concerned with an improvement in a process for preparing a high-cis polybutadiene.

It is an object of this invention to provide an improved method of preparing polybutadiene containing at least 80 percent cis-1,4 addition.

It is another object of this invention to provide a method for increasing the yield of cis-1,4-polybutadiene when polymerization is carried out in an aliphatic diluent.

Other aspects, advantages, and objects of this invention will be apparent to those skilled in the art on consideration of the accompanying disclosure and claims.

I have discovered a process whereby the conversion rate of 1,3-butadiene to cis-1,4-polybutadiene can be increased in the presence of aliphatic and cycloaliphatic hydrocarbon diluents and a catalyst formed by mixing an organometallic compound with an iodine-containing component by the addition of halogenated or nitrated alkanes, cycloalkanes, and aromatic hydrocarbons.

Broadly speaking, in a process for polymerizing 1,3-butadiene in the presence of a catalyst formed on mixing an organometallic compound and an iodine-containing component including a titanium halide, the present invention resides in conducting the polymerization in the presence of an aliphtic or cycloaliphatic hydrocarbon diluent and a minor amount of a halogenated alkane, halogenated cycloalkane, or halogenated aromatic hydrocarbon or a nitrated alkane, nitrated cycloalkane, or nitrated aromatic hydrocarbon, or mixtures thereof. It has been discovered that the presence of the halogenated or nitrated compound gives a marked increase in the conversion rate over that obtained with the aliphatic or cycloaliphatic hydrocarbon diluent alone and provides a means for controlling the inherent viscosity of the polymer. Preferably a halogenated compound will be used. The resulting product has a high cis-1,4 structure and is gel free. By using aliphatic and cycloaliphatic hydrocarbon diluents the reaction mixture is sufficiently fluid that it is easily agitated and presents very little problems in handling thereof. Other advantages of the present process are that the aliphatic hydrocarbons are, in general, easier to remove at the conclusion of the polymerization reaction and they are less expensive than aromatic hydrocarbons. The problem of toxicity is less than is normally associated with aromatic hydrocarbons such as benzene.

Aliphtic hydrocarbons which can be used as diluents are preferably those containing from 3–12, inclusive, carbon atoms per molecule. Examples of such compounds include propane, n-butane, n-pentane, isopentane, n-hexane, isohexane, 2,2,4-trimethylpentane (isooctane), n-decane, n-dodecane, and the like. Cycloparaffins such as cyclopentane, cyclohexane, and methylcyclohexane can also be employed as well as monoolefins such as 1-butene, 2-butene, pentenes, hexenes, heptenes, cyclohexene, etc. Mixtures of the various paraffins, cycloparaffins, monoolefins, and cyclomonoolefins can also be utilized.

Halogenated and nitrated alkanes employed in the present process are generally those containing from 1–4 carbon atoms per molecule. Halogenated and nitrated cycloalkanes and aromatic hydrocarbons are also applicable. The cycloalkanes generally contain up to 8 carbon atoms. The aromatic compounds employed in this invention contain one benzene ring. Both mono- and poly-halogenated compounds can be used but in the case of iodo compounds, and also nitro compounds, it is preferred that only one substituent be present. Illustrative of the compounds that can be employed are the following: methylchloride, methyl bromide, methyl iodide, methylene fluoride, methylene chloride, chloroform, carbon tetrachloride, 1,2-dichloroethane, ethyl iodide, 1,1-dibromoethane, trifluoroethane, 1,1,2,2-dichloroethane, 1,3-difluoropropane, 1,2,3-tribromopropane, 1,1,2,3,3-pentachloropropane, n-butyl iodide, tert-butyl chloride, 1,2,3,4-tetrachlorobutane, chlorocyclopentane, 1,3-difluorocyclopentane, chlorocyclohexane, 4-chloromethylcyclohexane, 1,4-dichlorocyclohexane, chlorobenzene, bromobenzene, fluorobenzene, 1,2-dichlorobenzene, hexachlorobenzene, iodobenzene, nitromethane, nitroethane, 2-nitrobutane, nitrobenzene, 3-chloronitropropane, 4-fluoronitrobutane, nitrocyclohexane, and 3-chloronitrobenzene.

The amount of halogenated or nitrated compound employed can vary over a fairly broad range and will depend to a considerable extent upon the degree of substitution, i.e., the number of halo and/or nitro groups per molecule. In general the amount of halo- or nitro-compound is in the range from 0.5 to 50 parts by weight per 100 parts of butadiene to be polymerized.

The halogenated or nitrated compound is added to the aliphatic diluent before the polymerization reaction is initiated. It is within the scope of this invention to use mixtures of the diluents described hereinbefore. It is also within the scope of this invention to use mixtures of the halogenated and nitrated compounds.

The polybutadiene product of this invention contains at least 80 percent cis-1,4 addition, e.g., 80 to 98 percent and higher. A large number of different stereospecific catalysts can be employed in preparing this product. It is usually preferred to employ a catalyst which is selected from the group consisting of (1) a catalyst which forms on mixing components comprising an organo-metal compound having the formula $R_mM$, wherein R is alkyl, cycloalkyl, aryl, alkaryl, aralkyl, alkylcycloalkyl, arylcycloalkyl, cycloalkylalkyl, or cycloalkylaryl, M is aluminum, mercury, zinc, beryllium, cadmium, magnesium, sodium or potassium, and $m$ is equal to the valence of the metal M, and titanium tetraiodide, (2) a catalyst which forms on mixing components comprising an organometal compound having the formula $R_nM'$, wherein R is an organo radical as defined above, M' is aluminum, magnesium, lead, sodium, or potassium, and $n$ is equal to the valence of the metal M', titanium tetrachloride and titanium tetraiodide, (3) a catalyst which forms on mixing components comprising an organometal compound having a formula $R_3Al$ or $R_2Mg$, wherein R is an organo radical as defined above, a compound having the formula $TiX_a$, wherein X is chlorine or bromine and $a$ is an integer from 2 to 4, inclusive, and elemental iodine or an organoiodide, (4) a catalyst which forms on mixing components comprising an organometal compound having the formula $R_xM''$, wherein R is an organo radical as defined above, M'' is aluminum, gallium, indium, or thallium, and $x$ is equal to the valence of the metal M'', a titanium halide having the formula $TiX_4$, wherein X is chlorine or bromine, and an inorganic halide having the formula $M'''I_b$, wherein M''' is beryllium, zinc, cadmium, aluminum, gallium, indium, thallium, silicon, germanium, tin, lead, phosphorus, antimony, arsenic, and bismuth, and $b$ is an integer from 2 to 5, inclusive, and (5) a catalyst which forms on mixing components comprising an organo compound having the formula $R_xM''$, wherein R, M'', and $x$ are as defined above, titanium tetraiodide, and an inorganic halide having the formula $M^{iv}X_c$, wherein $M^{iv}$ is aluminum, gallium, indium, thallium, germanium, tin, lead, phosphorus, antimony, arsenic and bismuth, X is chloride or bromine, and $c$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis-1,4-polybutadiene:

triisobutylaluminum and titanium tetraiodide
triethylaluminum and titanium tetraiodide
triisobutylaluminum, titanium tetrachloride and titanium tetraiodide
triethylaluminum, titanium tetrachloride and titanium tetraiodide
diethylzinc and titanium tetraiodide
dibutylmercury and titanium tetraiodide
triisobutylaluminum, titanium tetrachloride and iodine
triethylaluminum, titanium tetrabromide and iodine
n-amylsodium and titanium tetraiodide
phenylsodium and titanium tetraiodide
n-butylpotassium, titanium tetrachloride and titanium tetraiodide
n-amylsodium, titanium tetrachloride and titanium tetraiodide
triphenylaluminum and titanium tetraiodide
triphenylaluminum, titanium tetraiodide and titanium tetrachloride
triphenylaluminum, titanium tetrachloride and iodine
tri-alpha-naphthylaluminum, titanium tetrachloride and iodine
tribenzylaluminum, titanium tetrabromide and iodine
diphenylzinc and titanium tetraiodide
di-2-tolylmercury and titanium tetraiodide
tricyclohexylaluminum, titanium tetrachloride and titanium tetraiodide
ethylcyclopentylzinc and titanium tetraiodide
tri(3-isobutylcyclohexyl)aluminum and titanium tetraiodide
tetraethyllead, titanium tetrachloride and titanium tetraiodide
dimethylphenyllead, titanium tetrachloride and titanium tetraiodide
diphenylmagnesium and titanium tetraiodide
di-n-propylmagnesium, titanium tetrachloride and titanium tetraiodide
dimethylmagnesium, titanium tetrachloride and iodine
diphenylmagnesium, titanium tetrabromide and iodine
methylethylmagnesium and titanium tetraiodide
dibutylberyllium and titanium tetraiodide
diethylcadmium and titanium tetraiodide
diisopropylcadmium and titanium tetraiodide
triisobutylaluminum, titanium tetrachloride and 1,4-diiodi-2-butene
triethylaluminum, titanium tetrabromide and isobutyl iodide
di-n-propylmagnesium, titanium tetrachloride and methyliodide
triisobutylaluminum, titanium tetrachloride and iodoform
triisobutylaluminum, titanium tetrachloride and antimony triiodide
triisobutylaluminum, titanium tetrachloride and aluminum triiodide
triisobutylaluminum, titanium tetrabromide, and aluminum triiodide
triethylaluminum, titanium tetrachloride, and phosphorus triiodide
tri-n-dodecylaluminum, titanium tetrachloride and tin tetraiodide
triethylgallium, titanium tetrabromide and aluminum triiodide
tri-n-butylaluminum, titanium tetrachloride and antimony triiodide
tricyclopentylaluminum, titanium tetrachloride and silicon tetraiodide
triphenylaluminum, titanium tetrachloride and gallium triiodide
triisobutylaluminum, titanium tetraiodide and tin tetrachloride
triisobutylaluminum, titanium tetraiodide and antimony trichloride
triisobutylaluminum, titanium tetraiodide and aluminum trichloride
triisobutylaluminum, titanium tetraiodide, and tin tetrabromide
triethylgallium, titanium tetraiodide and aluminum tribromide
triethylaluminum, titanium tetraiodide and arsenic trichloride
tribenzylalumium, titanium tetraiodide and germanium tetrachloride The amount of the catalyst used in preparing the cis-polybutadiene product can vary over a rather wide range. The amount of the organometal used in the catalyst composition is usually in the range of 1.0 to 20 moles per mole of the halogen-containing component, i.e., a metal halide with or without a second metal halide or elemental iodine. When using an organoaluminum compound, a preferred mole ratio is from 2.5:1 to 12:1 of the organo- aluminum compound to the halogen containing component. When using organocompounds of other metals, a preferred mole ratio is from 1:1 to 2:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mole ratio of the tetrachloride or tetrabromide to the iodide is usually in the range of 0.05:1 to 5:1. With a catalyst system comprising an organometal compound, a titanium chloride or bromide and elemental iodine, the mole ratio of titanium haide to iodine is generay in the range of 10:1 to 0.25:1, preferably 3.1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing the cis-polybutadiene. These materials include carbon dioxide, oxygen and water. It is usually desirable, therefore, that the butadiene and the diluent be freed of these materials as well as other materials which may tend to inactivate the catalyst. Furthermore, it is desirable to remove air and moisture from the reaction vessel in which the polymerization is to be conducted. Upon completion of the polymerization reaction, the reaction mixture is then treated to inactivate the catalyst and recover the rubbery polymer. A suitable method for accomplishing this result involves steam stripping the diluent from the polymer. In another suitable method, a catalyst inactivating material, such as an alcohol, is added to the mixture so as to inactivate the catalyst and cause precipitation of the polymer. The polymer is then separated from the alcohol and diluent by any suitable means, such as decantation or filtration. It has been found to be advantageous to add an antioxidant, such as phenyl-beta-naphthylamine or 2,2'-methylene-bis(4-methyl-6-tert-butyl-phenol), to the polymer solution prior to recovery of the polymer.

A more comprehensive understanding of the invention can be obtained by referring to the following illustrative examples, which are not intended, however, to be unduly limitative of the invention.

The microstructure of each cis-polybutadiene referred to in the examples was determined by dissolving a sample of the polymer in carbon disulfide so as to form a solution having 25 grams of polymer per liter of solution. The infrared spectrum of the solution (percent transmission) was then determined in a commercial infrared spectrophotometer.

The percent of the total unsaturation present as trans 1,4- was calculated according to the following equation and consistent units:

$$\epsilon = \frac{E}{tc}$$

where $\epsilon$=extinction coefficient (liters-moles$^{-1}$-centimeters$^{-1}$); E=extinction (log $I_o/I$); $t$=path lengths (centimeters; and $c$=concentration (moles double bond/liter). The extinction was determined at the 10.35 micron band and the extinction coefficient was 146 (liters-moles$^{-1}$-centimeters$^{-1}$).

The percent of the total unsaturation present as 1,2- (or vinyl) was calculated according to the above equation, using the 11.0 micron band and an extinction coefficient of 209 (liters-moles$^{-1}$-centimeters$^{-1}$).

The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

Inherent viscosity was determined by placing one-tenth gram of polymer in a wire cage made from 80 mesh screen which was then placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

Determination of gel was made along with the inherent viscosity determination. The wire cage was calibrated for toluene retention in order to correct the weight of swelled gel and to determine accurately the weight of dry gel. The empty cage was immeresd in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forcepts and placed in the two-ounce bottle. The same procedure was followed for determining the weight of swelled gel as was used for calibration of the cage. The weight of swelled gel when present is corrected by subtracting the cage calibration.

EXAMPLE I 1,3-butadiene was polymerized in the presence of a catalyst formed on mixing triisobutylaluminum, titanium tetrachloride, and iodine using n-pentane as the diluent together with variable quantities of methylene chloride. The recipe was as follows:

| | |
|---|---|
| 1,3-butadiene, parts by weight | 100 |
| n-Pentane, parts by weight | 600 |
| Methylene chloride, parts by weight | Variable |
| Triisobutylaluminum, mmoles | 2.5 |
| Titanium tetrachloride, mmoles | 0.4 |
| Iodine, mmoles | 0.8 |
| Temperature, ° F. | 41 |
| Time, hours | 32 |

Pentane was charged first after which the reactor was purged with nitrogen. Methylene chloride was added followed by the butadiene and then the triisobutylaluminum (0.6 molar solution in cyclohexane). The mixture was cooled to 41° F. after which the iodine was added (0.2 molar solution in toluene) and finally the titanium tetrachloride (0.1 molar solution in toluene). A series of runs was made. At the conclusion of the polymerization period, each reaction was shortstopped with a solution of 2,2'-methylene-bis(4-methyl-6-tert-butylphenol) in a mixture of equal volumes of isopropyl alcohol and toluene, the amount used being sufficient to provide about one part by weight of the antioxidant per 100 weight parts of polymer. The polymer was then coagulated in isopropyl alcohol, separated, and dried. Results were as follows:

| Run No. | CH$_2$Cl$_2$, p.h.m. | Conv., percent | Inherent viscosity | Gel, percent |
|---|---|---|---|---|
| 1 | None | 9 | 0.54 | 0 |
| 2 | 10 | 35 | 1.56 | 0 |
| 3 | 20 | 25 | 1.35 | 0 |
| 4 | 50 | 17 | 1.24 | 0 | p.h.m.=parts by weight per 100 weight parts of monomer.

Microstructure was determined by infrared examination on the product from run 2 and gave the following results:

|  | Percent |
|---|---|
| Cis | 82.8 |
| Trans | 13.8 |
| Vinyl | 3.4 |

The data show that methylene chloride gave a pronounced increase in conversion and that by varying the quantity of the halogen-containing compound, the inherent viscosity of the product can be controlled.

EXAMPLE II 1,3-butadiene was polymerized in the presence of a catalyst formed on mixing triisobutyl aluminum, titaniumtetrachloride and iodine using cyclohexane as the diluent together with variable quantities of methylene chloride. The following recipe was used:

| | |
|---|---|
| 1,3-butadiene, parts by weight | 100 |
| Cyclohexane, parts by weight | 850 |
| Methylene chloride, parts by weight | Variable |
| Triisobutylaluminum, mmoles | 2.5 |
| Titanium tetrachloride, mmole | 0.4 |
| Iodine, mmole | 0.8 |
| Temperature, °F. | 41 |
| Time, hours | 25 |

The procedure employed in carrying out the reaction was similar to that described in Example I. Results were as follows:

| Run No. | CH$_2$Cl$_2$, p.h.m. | Conv., percent | Inherent viscosity | Gel, percent |
|---|---|---|---|---|
| 1 | None | 69 | 2.19 | 0 |
| 2 | 10 | 87 | 1.97 | 0 |
| 3 | 50 | 81 | 1.93 | 0 |

Micro structure was determined on the products from Runs 2 and 3 and gave the following results.

|  | Run 2 | Run 3 |
|---|---|---|
| Cis, percent | 88.1 | 88.6 |
| Trans, percent | 8.7 | 8.3 |
| Vinyl, percent | 3.2 | 3.1 |

These data show that a significant increase in conversion was obtained when methylene chloride was present. The inherent viscosity also varied with the quantity of methylene chloride charged.

It will be apparent to those skilled in the art that many variations and modifications of the present invention can be made in view of the foregoing disclosure. The material appearing in the disclosure and examples is not intended to unduly limit the scope and spirit of the invention.

I claim:

1. In a process for polymerizing 1,3-butadiene in the presence of a catalyst which forms on mixing triisobutylaluminum, titanium tetrachloride and iodine, said polymerizing occurring at a temperature in the range of −100 to 250° F. and at a pressure sufficient to maintain the reaction mixture substantially in the liquid phase, the improvement which comprises initiating said polymerization in the presence of a diluent selected from the group consisting of aliphatic and cycloaliphatic hydrocarbons in admixture with methylene chloride, said methylene chloride being present in a range of 0.5 to 50 parts by weight per 100 parts 1,3-butadiene, and recovering the polymer of butadiene containing at least 80 percent cis-1,4-addition.

2. The process of claim 1 wherein said diluent is n-pentane.

3. The process of claim 1 wherein said diluent is cyclohexane.

References Cited

UNITED STATES PATENTS

| | | | |
|---|---|---|---|
| 2,898,329 | 8/1959 | Kittleson | 260—94.9 |
| 2,913,446 | 11/1959 | Cull et al. | 260—94.9 |
| 3,202,646 | 8/1965 | Naylor | 260—94.3 |
| 3,018,278 | 1/1962 | Shearer et al. | 260—93.7 |
| 3,045,001 | 7/1962 | Berger | 260—93.5 |

JOSEPH L. SCHOFER, Primary Examiner

R. A. GAITHER, Assistant Examiner